UNITED STATES PATENT OFFICE.

ANTHONY PIRZ, OF LONG ISLAND CITY, ASSIGNOR, BY MESNE ASSIGNMENTS, TO REUBEN C. BARROWS, OF NEW YORK, N. Y.

IMPROVEMENT IN THE MANUFACTURE OF ACETIC ACID.

Specification forming part of Letters Patent No. 209,978, dated November 19, 1878; application filed August 22, 1878.

*To all whom it may concern:*

Be it known that I, ANTHONY PIRZ, of Long Island City, Queens county, in the State of New York, have invented certain new and useful Improvements relating to the Manufacture of Acetic Acid; and I do hereby declare that the following is a full and exact description thereof.

I purify the impure acetic acid resulting from distillation of wood by treating it with permanganate of potassa.

The acetic acid which I ordinarily employ, and for the purification of which this invention is especially applicable, is made from wood, by subjecting it to destructive distillation, applying the condensed vapors to quicklime or caustic soda, and subsequently treating the resulting acetate of lime or other alkali with sulphuric acid to displace the acetic.

Acetic acid may be thus prepared in liberal quantities at a small cost; but the acid is unfit for some purposes by reason of the presence of smoky and tarry impurities.

I treat the impure acetic acid, which I will term "pyroligneous acid," by distillation, in the ordinary way, and when it is purified as much as possible by the ordinary method, I dissolve and stir into it a solution of permanganate of potassa and distill the product. The acid so obtained is chemically pure and superior to any acetic acid yet known to me.

The quantity of permanganate of potassa I have used varied from from one-half ($\frac{1}{2}$) to one and one-half ($1\frac{1}{2}$) pound of permanganate for each one hundred (100) pounds of impure acetic acid.

The quantity of permanganate of potassa may vary according to the quantity of impurities in the acid.

The preferable mode of applying the permanganate is by dissolving the crystals in cold acetic acid. A few pailfuls may be taken from the tank, and on introducing the permanganate crystals they may be soon dissolved by stirring. A few gallons thus prepared is subsequently added and stirred well in the tank. If there is much tarry or analogous objectionable foreign matter, including any organic matter, the permanganate solution acts on it to rapidly oxidize it. In such case the acetic acid will become turbid by the precipitation of a great quantity of brown matter. The acid thus treated is then slowly distilled, the pure acetic acid passing over to the condenser, the impurities remaining in the still.

If the permanganate of potassa is added to acetic acid which is already pure, it will exhibit the characteristic violet color in the acid, which will remain for several days. I can render available this characteristic of the material as a test of the success of the purification. The beautiful violet color will frequently appear on adding the permanganate to impure acid, but it will be rapidly changed into the brown color by its combination with the impurities. When the color is retained it is a sure indication that there is no more organic matter in the acetic acid. Only a small quantity of the permanganate is required. I have employed one (1) pound of permanganate for the purification of one hundred (100) pounds of tolerably concentrated acetic acid produced from the acetate of lime.

I claim as my improvement—

In the treatment of impure acetic acid with permanganate of potash, the distillation of the purified acid in presence of the permanganate, substantially as set forth.

In testimony whereof I have hereunto set my hand this 20th day of August, 1878, in the presence of two subscribing witnesses.

ANTHONY PIRZ.

Witnesses:
J. FRED. FRANKLIN,
GEORG HORN.